(12) United States Patent
Olivier

(10) Patent No.: US 11,092,278 B2
(45) Date of Patent: Aug. 17, 2021

(54) CABLE ATTACHMENT SYSTEM

(71) Applicant: ION Geophysical Corporation, Houston, TX (US)

(72) Inventor: Andre W. Olivier, River Ridge, LA (US)

(73) Assignee: Ion Geophysical Corporation, Houston, TX (US)

( * ) Notice: Subject to any disclaimer, the term of this patent is extended or adjusted under 35 U.S.C. 154(b) by 472 days.

(21) Appl. No.: 16/103,377

(22) Filed: Aug. 14, 2018

(65) Prior Publication Data

US 2019/0063672 A1    Feb. 28, 2019

Related U.S. Application Data

(60) Provisional application No. 62/545,012, filed on Aug. 14, 2017.

(51) Int. Cl.
| | | |
|---|---|---|
| *F16M 11/14* | (2006.01) | |
| *F16M 13/02* | (2006.01) | |
| *F16G 11/00* | (2006.01) | |
| *G01V 1/38* | (2006.01) | |
| *F16G 11/02* | (2006.01) | |
| *F16G 11/06* | (2006.01) | |
| *B63B 21/08* | (2006.01) | |
| *B63B 21/66* | (2006.01) | |
| *G01V 1/16* | (2006.01) | |

(52) U.S. Cl.
CPC .............. *F16M 11/14* (2013.01); *B63B 21/08* (2013.01); *B63B 21/66* (2013.01); *F16G 11/00* (2013.01); *F16G 11/025* (2013.01); *F16G 11/06* (2013.01); *F16M 13/02* (2013.01); *G01V 1/3843* (2013.01); *G01V 1/162* (2013.01); *G01V 1/38* (2013.01)

(58) Field of Classification Search
CPC ........ F16M 11/14; F16M 13/02; B63B 21/08; B63B 21/66; F16G 11/06; F16G 11/025; F16G 11/00; G01V 1/3843
See application file for complete search history.

(56) References Cited

U.S. PATENT DOCUMENTS

| | | | | |
|---|---|---|---|---|
| 9,958,565 | B2 * | 5/2018 | Henman | G01V 1/3843 |
| 10,641,914 | B2 * | 5/2020 | Rokkan | G01V 1/201 |
| 2013/0266366 | A1 * | 10/2013 | Woodard | G01V 1/202 |
| | | | | 403/300 |
| 2015/0362606 | A1 * | 12/2015 | Henman | G01V 1/201 |
| | | | | 367/15 |
| 2016/0041280 | A1 * | 2/2016 | Naes | G01V 1/3852 |
| | | | | 367/149 |
| 2017/0123091 | A1 * | 5/2017 | Stewart | G01P 15/0802 |

* cited by examiner

*Primary Examiner* — Ian J Lobo
(74) *Attorney, Agent, or Firm* — Patterson + Sheridan, LLP

(57) ABSTRACT

An attachment system for securing an object, such as a seismic node or other external device, to a rope or cable includes a latch block and a latch member movably connected to the latch block for selective engagement with a coupling feature on the rope or cable. The latch block may be attached to or integrated with the object and can include opposing side members defining a channel extending through the latch block, the channel sized for selective receipt of the rope or cable therein. The latch member may selectively engage the coupling feature as the rope or cable is received in sliding engagement within the channel.

15 Claims, 7 Drawing Sheets

CABLE ATTACHMENT SYSTEM

CROSS-REFERENCE TO RELATED APPLICATIONS

This application claims priority to U.S. Provisional Patent Application No. 62/545,012, filed Aug. 14, 2017, entitled "CABLE ATTACHMENT SYSTEM," which is incorporated by reference herein, in the entirety and for all purposes.

BACKGROUND

This application relates generally to cable attachment systems for securing an object to a rope or cable. The attachment system may be utilized in seismic surveys and sensor arrangements for gathering seismic data. More generally, the system may relate to improved deployment and recovery technologies for seismic receivers, nodes and other devices or objects positioned along a rope or cable and selectively coupled or decoupled therewith.

Marine seismic exploration is traditionally conducted by firing acoustic sources, which generate collapsing air bubbles in the water column. The collapse of the bubbles generates acoustic pulses, which propagate through the water and are transmitted to the earth in the form of seismic waves. Some of the seismic waves reflect from subsurface structures, and the resulting signals can be detected by an array of seismic receivers disposed on the seafloor, or towed behind a seismic vessel. The reflected wavefield can be analyzed to generate geophysical data and images indicating the composition of the Earth near the survey location.

In traditional marine seismic exploration, an array of seismic sensors or receivers is towed near the sea surface behind a marine vessel. The receivers typically include pressure sensors or hydrophones, which are mounted to sensor cables commonly referred to as streamers. The streamers serve as platforms or carriers for the seismic sensors, which are distributed along the length of each streamer cable in the array.

A set of seismic sources can also be towed near the sea surface, and operated to periodically emit acoustic energy. Rope and cable-based seismic systems can also be used to deploy ocean bottom sensor nodes, typically including both hydrophones and particle motion sensors such as geophones or accelerometers.

In both towed and ocean-bottom seismic exploration, the receivers and nodes may be attached to a rope or cable prior to deployment, and then removed after data acquisition and retrieval. The attachment and removal processes can be time consuming, and improper coupling procedures can lead to equipment losses. Similar technical problems appear in other rope and cable attachment applications, not limited to seismic surveys. As a result, there is a continuous demand for improved techniques to securely couple objects to a rope or cable, while providing for safer, faster, and more efficient deployment and retrieval. Though these techniques may have particular application to seismic surveys and sensor arrangements, they may also be used to selectively attach any object of substantially any shape or size to a rope or cable, in a safe, quick, and efficient manner.

DETAILED DESCRIPTION

In the following, reference is made to embodiments of the invention. It should be understood, however, that the invention is not limited to the specifically described embodiments. Any combination of the following features and elements, as described in terms of the various embodiments and examples, is contemplated to implement and practice the invention.

Although various features of the invention may provide advantages over the prior art, and over other possible solutions to the problems address herein, whether or not such advantages are achieved does not limit the invention to a given embodiment. The following aspects, features and advantages of the invention are merely illustrative, and are not considered elements or limitations of the appended claims, except where explicitly recited. Likewise, reference to "the invention" shall not be construed as a generalization of any subject matter disclosed herein, and does not limit the claims except where included in the claim language.

Figure 1:
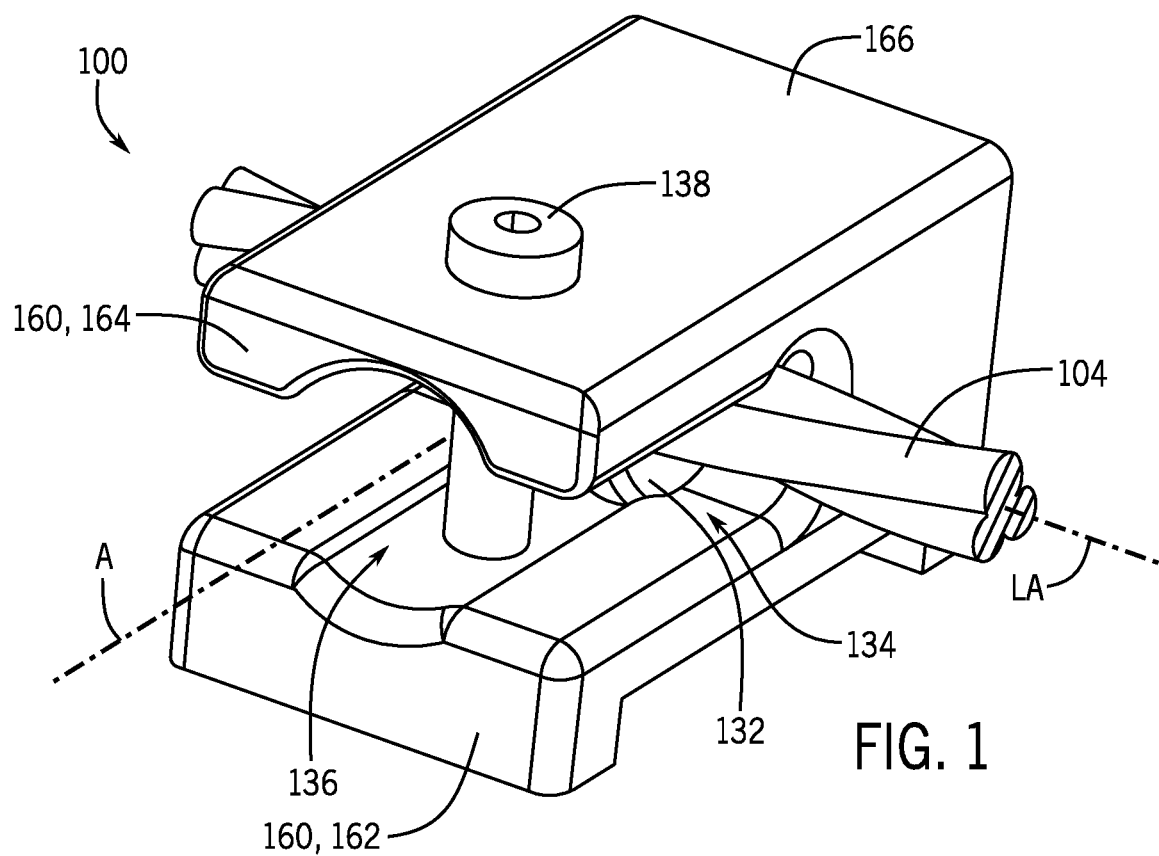
FIG. 1 is an isometric view of an attachment system for coupling an external device to a rope or cable.
Figure 2:
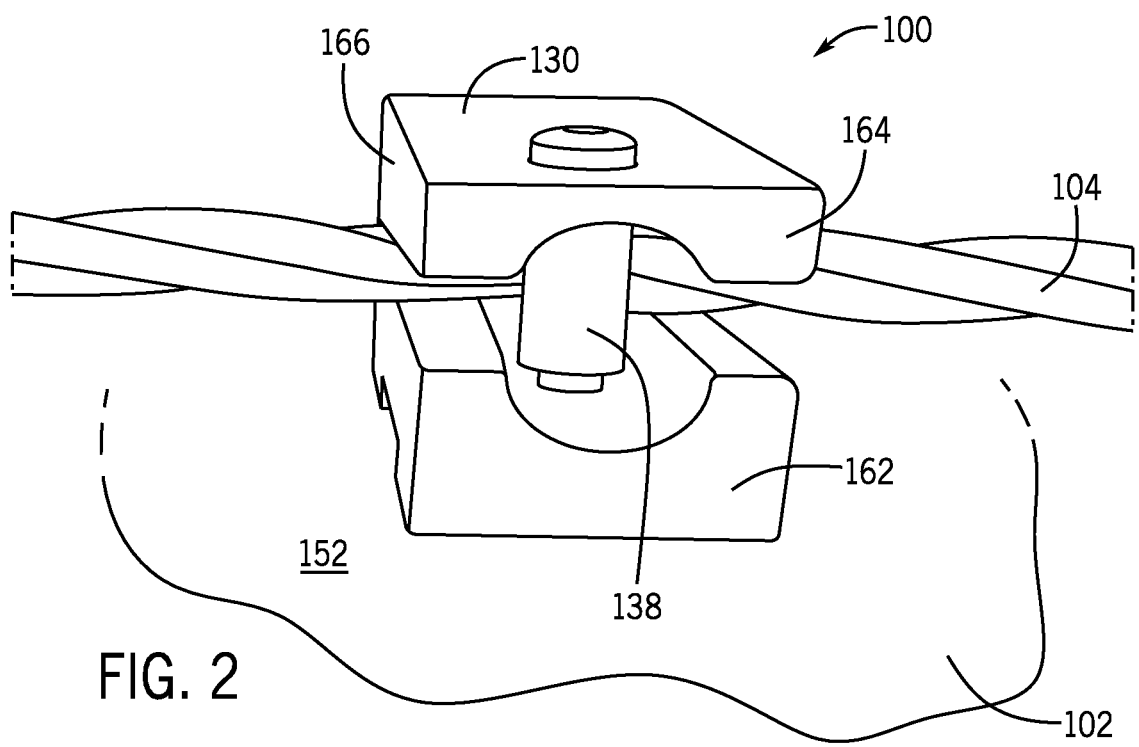
FIG. 2 is another isometric view of the attachment system of FIG. 1.

FIG. 1 is an isometric view of an attachment system 100 for coupling an external device or object 102 to a rope or cable 104. FIG. 2 is another isometric view of the attachment system 100 of FIG. 1, showing an external device 102 coupled to a rope or cable 104 via the attachment system 100.

As shown in FIGS. 1 and 2, an attachment system 100 is provided for securing an external device 102 to a rope or cable 104. The attachment system 100 has broad application. For example, the attachment system 100 may be used to attach any device of substantially any shape or size to the rope or cable 104. In one embodiment, the attachment system 100 according to the present disclosure may be used to attach a seismic device to an underwater cable 104, or a plurality of seismic devices, e.g., in a stationary or towed array configuration. More specifically, the attachment system 100 may be used to attach a seismic node, an acoustic pinging device, a streamer recovery device, a depth control, and/or a lateral control device, among others, to the rope or cable 104.

The examples above are for illustration purposes only, as the attachment system 100 may also be used to attach substantially any device or object to a rope or cable 104. As described herein, the attachment system 100 may be arranged to quickly and easily attach the external device 102 to the rope or cable 104. In like manner, the attachment system 100 may permit a user to quickly and easily decouple the external device 102 from the rope or cable 104.

As described herein, the rope or cable 104 may be formed of any suitable material, such as natural, synthetic, and/or metallic rope or cable material. The rope or cable 104 (e.g., a rope or cable or line, without limitation) may be configured for a particular environment or purpose. For example, in embodiments used for seismic data acquisition, the cable 104 may be configured for deployment to a seismic medium. More specifically, the cable 104 may be configured for towing one or more seismic nodes through the water column of a body of water (e.g., a lake, a sea, or an ocean), or for deploying the seismic nodes on the floor of the water body (e.g., on the ocean floor, on the seabed, etc.). Depending on the particular application, the cable 104 may include power and/or data lines for communication between the external device 102 and a data acquisition system, between the external device 102 and a user interface, between the external device 102 and the cable 104, or any combination thereof. The power and/or data lines may be formed integrally with the cable 104, or may be positioned to extend adjacent (e.g., alongside) the cable 104 depending on the particular application. In some embodiments, the cable 104 may be formed of a passive strength component, such as natural or synthetic fibers and/or metal wire, absent power or data lines.

Figure 3:
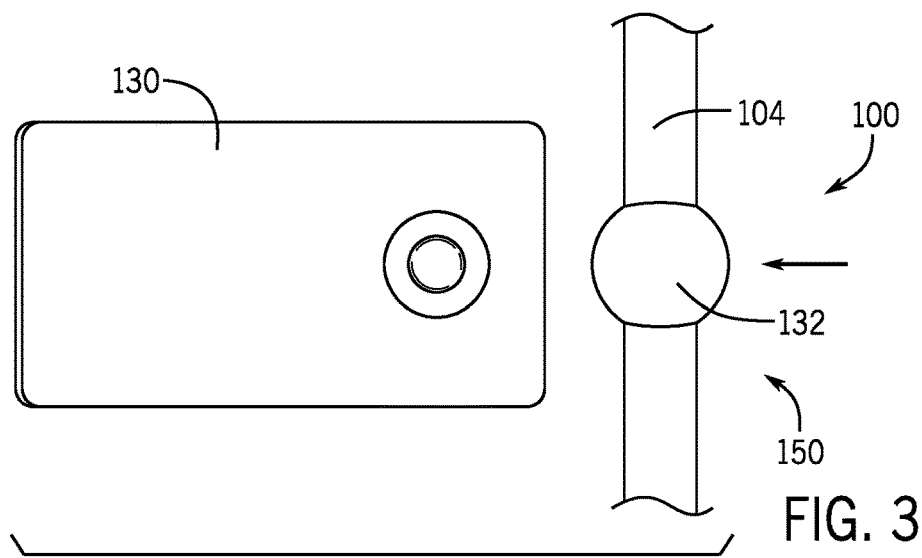
FIG. 3 is a partially exploded view of the attachment system of FIG. 1, showing a latch block positioned adjacent to a coupling feature coupled to the rope or cable.
Figure 4:
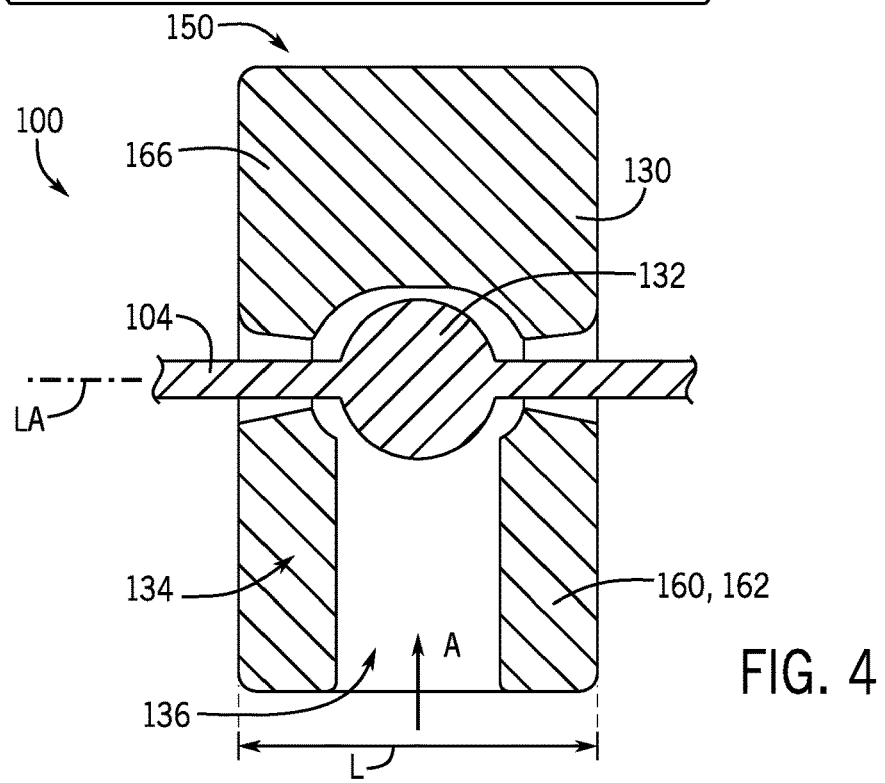
FIG. 4 is a cross sectional view of the attachment system of FIG. 1, showing the rope or cable extending within a channel defined within the latch block and the coupling feature on the rope or cable seated within a blind hole defined within the latch block.
Figure 5:
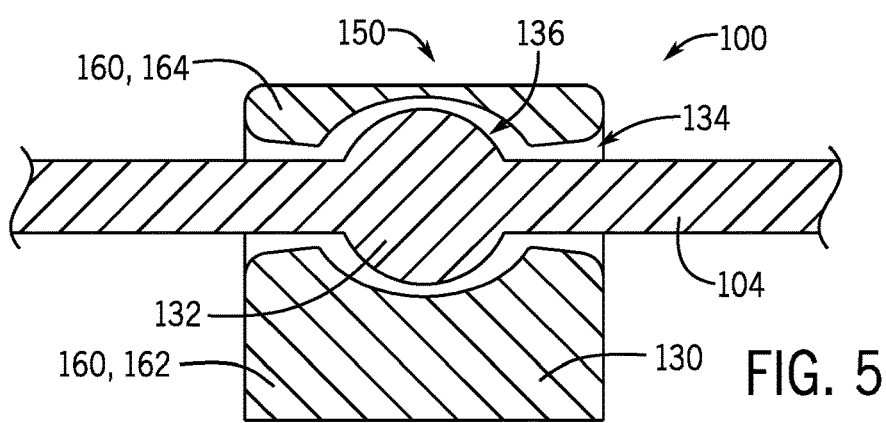
FIG. 5 is another cross sectional view of the attachment system of FIG. 1, showing the rope or cable extending within the channel and the coupling feature on the rope or cable seated within the blind hole.
Figure 6:
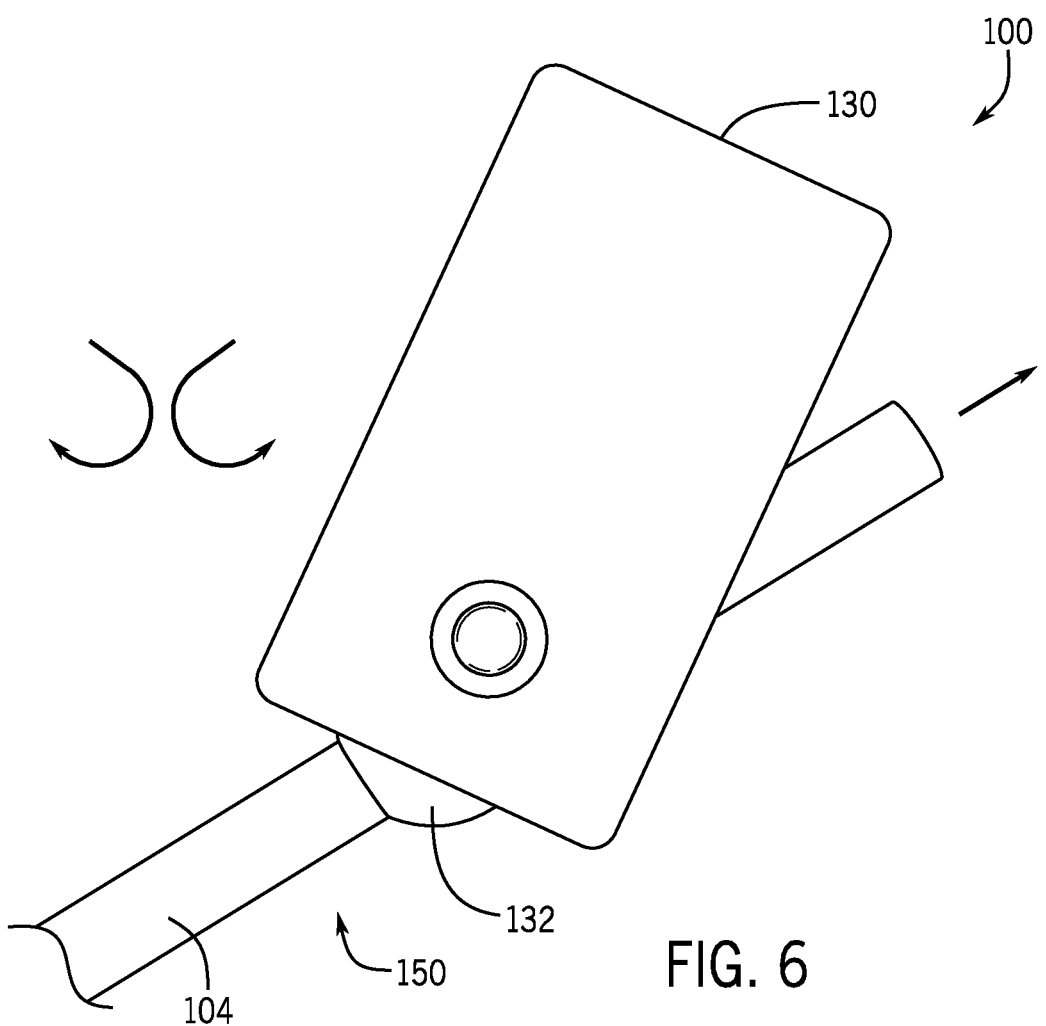
FIG. 6 is a top view of the attachment system of FIG. 1, showing the latch block positioned at an angle relative to the rope or cable for seating of the coupling feature within the latch block.

FIG. 3 is a partially exploded view of the attachment system 100 of FIG. 1, showing a latch block or latch apparatus 130 positioned adjacent to a coupling feature, engagement feature, or cable stop 132 coupled to the cable 104. FIG. 4 is a cross sectional view of the attachment system 100 of FIG. 1, showing the cable 104 extending within a channel 134 defined within the latch block or apparatus 130 and the coupling feature or stop 132 on the cable 104 seated within a blind hole or cavity 136 defined with the latch block 130. FIG. 5 is another cross sectional view of the attachment system 100 of FIG. 1, showing the cable 104 extending within the channel 134 and the coupling feature 132 on the cable 104 seated within the blind hole or cavity 136. FIG. 6 is a top view of the attachment system 100 of FIG. 1, showing the latch block 130 positioned at an angle relative to the cable 104 for seating of the coupling feature 132 within the latch block 130.

As shown in FIGS. 3-6, the attachment system 100 may include a coupling mechanism 150 arranged to releasably secure the external device 102 to the cable 104. As an exemplary embodiment, the coupling mechanism 150 includes a latch block or latch apparatus 130 with a latch member 138 (see FIGS. 1 and 7, for example) coupled thereto. In one embodiment, the latch block 130 may be attached to the external device 102, such as to an outer surface 152 of the external device 102 (see FIG. 2). In other embodiments, the latch block 130 may be defined as part of the external device 102 itself, such as formed integrally (e.g., monolithically) with at least a portion of the external device 102, or provided as a discrete latch mechanism or latch apparatus 130 for use in coupling mechanism 150.

In this manner, at least a portion of the external device 102 may be sized and shaped to define the latch block 130, or a latch apparatus 130 may be provided independently. As explained herein, the latch member 138 may selectively secure the coupling mechanism 150 to a coupling feature or stop 132 on the cable 104. In one embodiment, the latch member 138 may be movably connected (e.g., pivotably connected) to the latch block 130 for selective engagement with the coupling feature 132 on the cable 104.

In some embodiments, the latch block or apparatus 130 may be configured for selective receipt of the cable 104 therein. For instance, the latch block 130 may include opposing side members 160 defining the channel 134 extending through the latch block 130 therebetween. For example, the opposing side members 160 of the latch block 130 may include first and second side plates 162, 164 extending from a main body 166, though other suitable configurations are contemplated. The channel 134 may be defined between the first and second side plates 162, 164. As described herein, the channel 134 may be sized for selective receipt of the cable 104 therein. In such embodiments, the latch member 138 selectively engages the coupling feature 132 affixed to the cable 104 as the cable 104 is received within the channel 134, e.g., with the cable 104 in sliding engagement within the channel 134.

In some embodiments, the latch block or apparatus 130 may include a blind hole or cavity 136 defined within, and along the depth of, the channel 134. In such embodiments, the blind hole or cavity 136 may include an axis A extending substantially orthogonal to a length L of the channel 134. For example, the channel 134 may extend the full length of the opposing side members 160. In such embodiments, the blind hole or cavity 136 may extend transverse to the channel 134. As explained herein, the blind hole or cavity 136 can be sized and shaped for engagement with the coupling feature 132 on the cable 104, e.g., when the coupling feature 132 is seated in the blind hole or cavity 136 by sliding engagement of the rope or cable 104 within the channel 134.

For example, the blind hole or cavity 136 may be sized and shaped to receive at least a portion of the coupling feature 132 therein. In one embodiment, the blind hole or cavity 136 may have a diameter greater than the width of the channel 134 (see FIG. 5). Such a configuration may allow the attachment system 100 to secure the external device 102 along the length of the cable 104, such as at a discrete location along the length of the cable 104. For example, the blind hole or cavity 136 may be sized and shaped to limit movement of the coupling feature 132 through the length L of the channel 134. In such embodiments, movement of the coupling feature 132 relative to the latch block 130 may be limited to only along the depth of the blind hole or cavity 136. In such embodiments, the latch member 138 may limit movement of the coupling feature 132 within the blind hole or cavity 136 to secure the coupling mechanism 150 to the cable 104, as explained herein.

Though the coupling mechanism 150 may secure the external device 102 to a discrete location along the length of the cable 104, the attachment system 100 may permit a degree of relative movement between the external device 102 and the cable 104. For example, as detailed herein, the engagement structure between the latch block or apparatus 130, the latch member 138, and the coupling feature or cable stop 132 on the cable 104 may provide for the external device 102 to rotate and/or pivot relative to a longitudinal axis LA of the cable 104 with the coupling mechanism 150 secured to the cable 104.

For example, the engagement structure between the latch block 130, the latch member 138, and the coupling feature 132 on the cable 104 may be adapted for the external device 102 to rotate freely about the longitudinal axis LA of the cable 104 with the coupling mechanism 150 secured to the cable 104, e.g., with the latch member 138 in rotational engagement with the coupling feature 132 seated in the blind hole or cavity 136. Additionally or alternatively, the engagement structure between the latch block 130, the latch member 138, and the coupling feature 132 on the cable 104 may be adapted for the external device 102 to pivot about the coupling feature 132 about an axis orthogonal to the longitudinal axis LA of the cable 104, e.g., with the latch member 138 in pivoting engagement with the coupling feature 132 seated in the blind hole or cavity 136, to provide for small or moderate pivoting movement of the external device 102 relative to the cable 104 during use, as explained herein. Such relative movement between the external device 102 and the cable 104 may limit damage to the coupling mechanism 150, the cable 104, and/or the external device 102 during use, e.g., during selective engagement or disengagement of the coupling member 150 with the rope or cable 104.

The latch block or apparatus 130 may be attached to the external device 102 in any suitable manner. For example, depending on the particular application, the main body 166 and the first side plate 162 of the latch block 130 may be coupled to the external device 102. In one embodiment, the main body 166 and the first side plate 162 may abut an outer surface 152 of the external device 102 (see FIG. 2). In such embodiments, the main body 166 and the first side plate 162 may be secured to the external device 102 in any suitable manner, such as via fasteners, adhesive, heat or sonic welding, and/or corresponding retention features.

Figure 7:
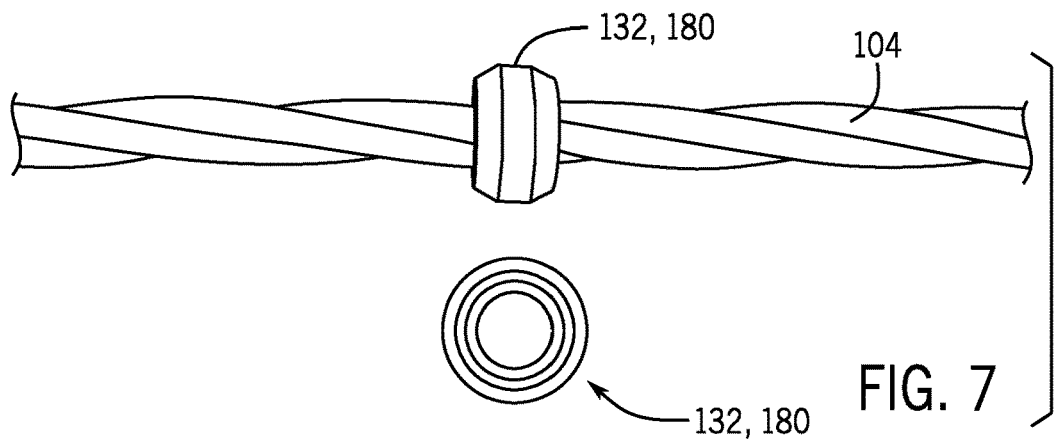
FIG. 7 is an elevation view of an additional coupling feature coupled to a rope or cable.
Figure 8:
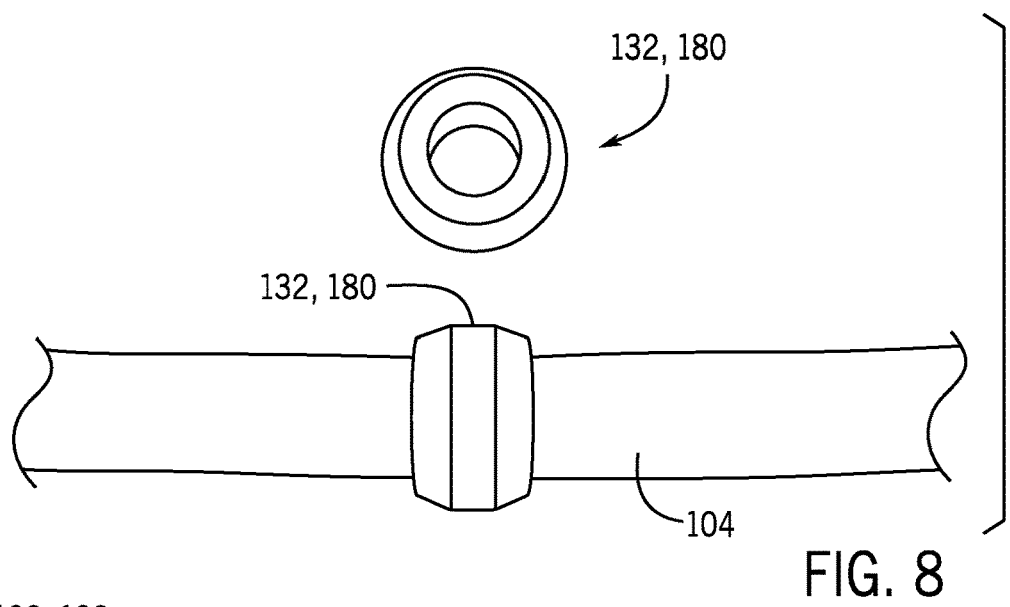
FIG. 8 is an elevation view of the coupling feature coupled to another rope or cable.
Figure 9:
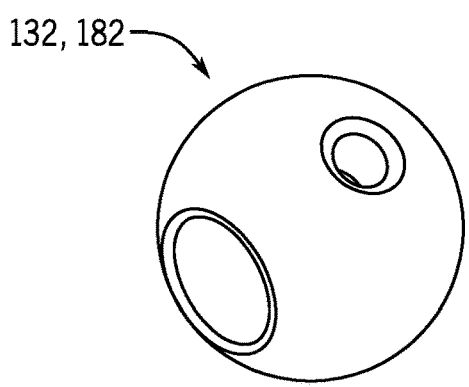
FIG. 9 is an isometric view of an additional coupling feature coupleable to a rope or cable.
Figure 10:
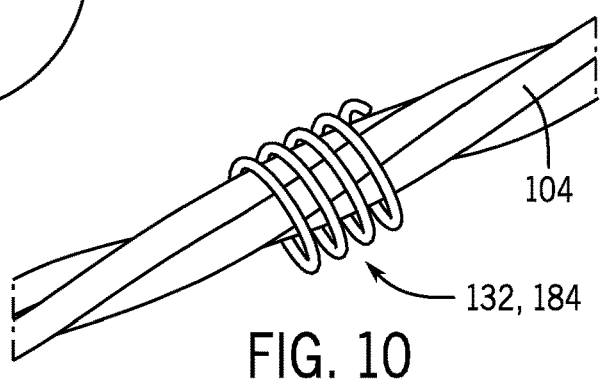
FIG. 10 is an isometric view of an additional coupling feature coupled to a rope or cable.

FIG. 7 is an elevation view of a coupling feature 132 coupled to the cable 104. FIG. 8 is an elevation view of the coupling feature 132 coupled to another cable 104. FIG. 9 is an isometric view of an additional coupling feature 132 coupleable to the cable 104. FIG. 10 is an isometric view of an additional coupling feature 132 coupled to the cable 104.

The coupling feature 132 may be substantially any device or structure operable to secure the coupling mechanism 150 to the cable 104. For example, in one particular embodiment, the coupling feature 132 includes a swage button or ferrule 180 affixed to the cable 104 (see FIGS. 7 and 8). In another embodiment, the coupling feature 132 may include a swage ball or other swaged element 182 affixed to the cable 104 by compressing engagement (see FIG. 9).

More generally, the coupling feature or stop 132 may be coupleable to the cable 104 by suitable mechanisms other than a swaged coupling, and the coupling feature 132 may be repositionable along the cable 104. For instance, as shown in FIG. 10, the coupling feature 132 may include a canted spring or other repositionable, frictionally biased feature 184. The canted spring or movable stop feature 184 may be sized for frictional engagement with the cable 104, for sliding to a selected position along cable 104. More generally, a suitable movable stop or similar coupling feature 184 may be configured for manual operation or manipulation to selectively position the coupling feature 184 in any desired location along a rope, cable or line 104.

The embodiments shown in FIGS. 7-10 are for illustration purposes only and the coupling features 132 or 184 can include any suitable structure operable to secure the coupling mechanism 150 to the cable 104, such as a swage, spring, split ring structure, or similar frictional engagement feature, among others. The coupling features 132 or 184 may be fixed to selected position on the cable 104 or selectively coupleable and/or moveable anywhere along the length of the cable 104 as desired.

For example, depending on the particular application, a user may move selectively the coupling feature 132 or 184 along the length of the cable 104 to position the external device 102 in a desired position along the cable 104. In such embodiments, a user may reposition the coupling feature 132 (and therefore the external device 102 once connected thereto) anywhere along the length of the cable 104, such as during deployment and/or retrieval of the cable 104 and/or the external device 102.

In the embodiments described herein, the coupling feature 132 is receivable within the blind hole or cavity 136 of the latch block or apparatus 130 to couple the external device 102 to the cable 104. In one embodiment, the coupling feature 132 may have one or more dimensions corresponding to the dimensions of the blind hole or cavity 136. For example, the coupling feature 132 may include a diameter corresponding to the diameter of the blind hole or cavity 136, such as a diameter greater than the width of the channel 134. In such embodiments, the differing sizes of the coupling feature 132 and the channel 134 may define an interference fit therebetween.

For example, as explained above, the interference fit between the coupling feature 132 and the channel 134 may limit movement of the coupling feature 132 relative to the latch block 130. For instance, the interference fit between the coupling feature 132 and the channel 134 may limit movement of the coupling feature 132 to only along the depth of the blind hole or cavity 136. Such a configuration may limit movement of the latch block 130 along the length of the cable 104, which may be beneficial to properly positioned the external device 102 along the cable 104 as desired by a user or by an automated actuator device.

Figure 11:
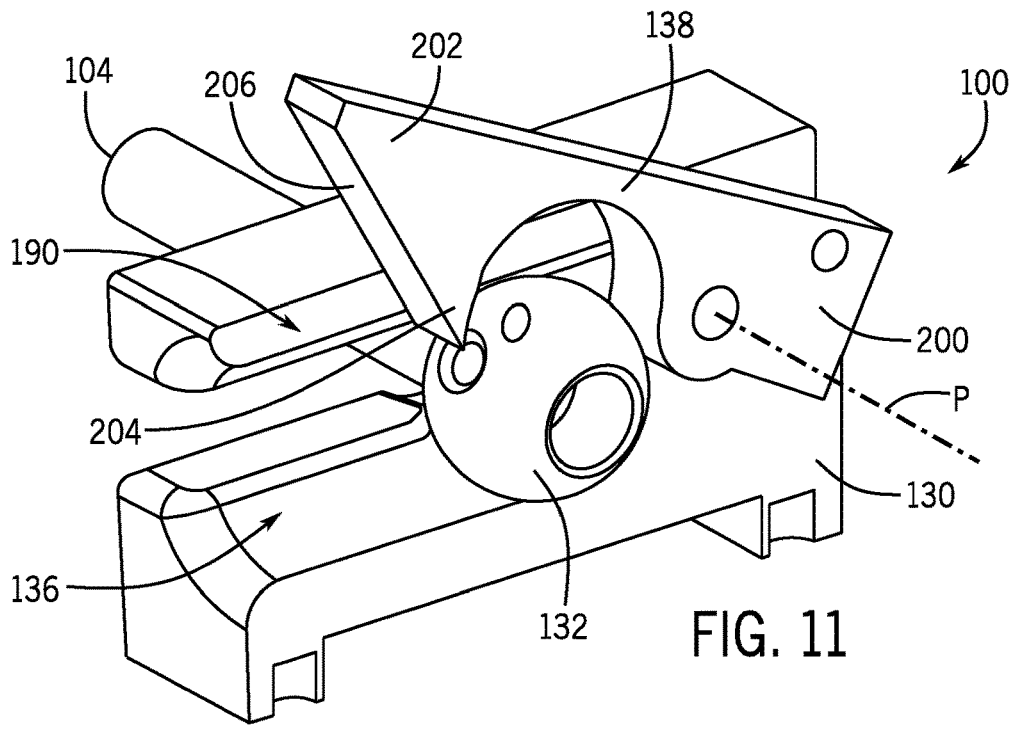
FIG. 11 is an isometric, cut-away view of another attachment system for coupling an external device to a rope or cable.
Figure 12:
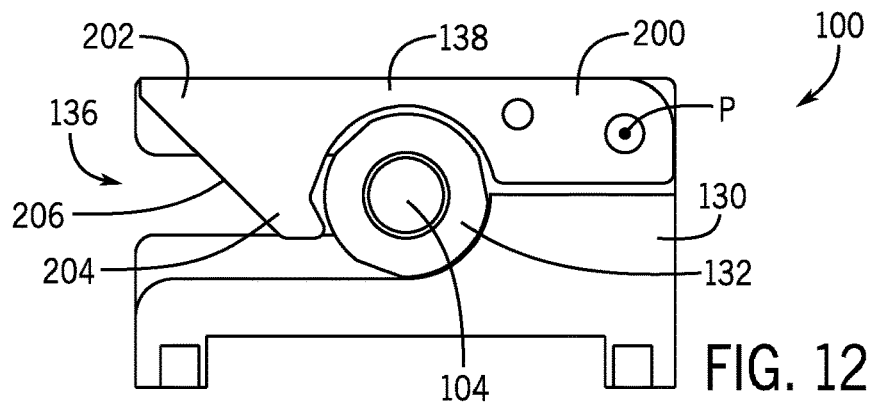
FIG. 12 is a cross sectional view of the attachment system of FIG. 11 with a latch member in a first, locked position.
Figure 13:
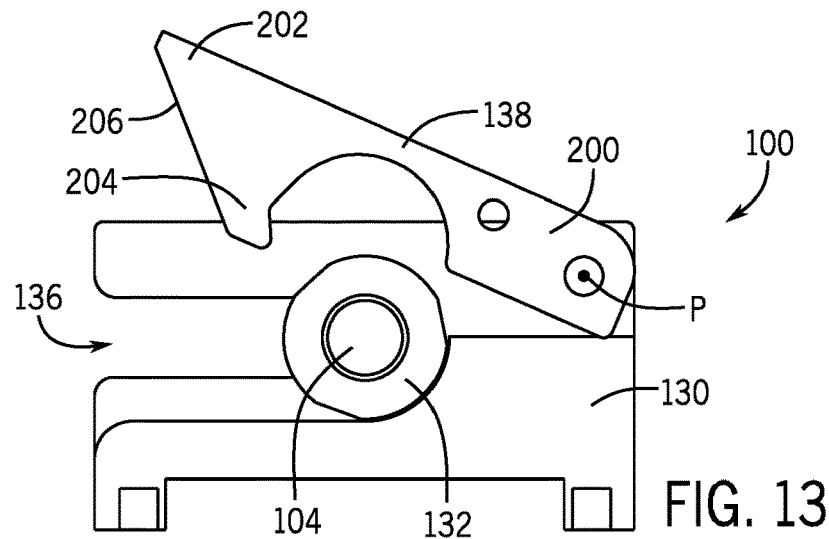
FIG. 13 is a cross sectional view of the attachment system of FIG. 11 with the latch member in a second, unlocked position.

FIG. 11 is an isometric, cut-away view of an attachment system 100 for coupling an external device 102 to the cable 104. FIG. 12 is a cross sectional view of the attachment system 100 of FIG. 11 with a latch member 138 in a first, locked position. FIG. 13 is a cross sectional view of the attachment system 100 of FIG. 11 with the latch member 138 in a second, unlocked position.

As described herein, the coupling mechanism 150 may be configured to releasably engage the coupling feature 132 to couple the external device 102 to the cable 104. For example, the latch member 138 may be configured to releasably engage the coupling feature 132 within the blind hole or cavity 136 to secure the coupling mechanism 150 to the cable 104. As explained herein, the latch member 138 may automatically engage the coupling feature 132 or may be positioned manually to engage the coupling feature 132 when desired. For example, the latch member 138 may be selectively coupled to the latch block or latch apparatus 130 by a user once the coupling feature 132 is seated within the blind hole or cavity 136. In other embodiments, seating the coupling feature 132 within the blind hole or cavity 136 may cause the latch member 138 to automatically engage the coupling feature 132. In one embodiment, the latch member 138 may be received within a slot 190 defined within the latch block 130, such as within the second side plate 164. The slot 190 and/or latch member 138 may be configured to provide a desired aesthetic and/or functional characteristic. For example, the slot 190 and/or latch member 138 may be sized and shaped such that the latch member 138 sits flush against the outer surface(s) of the latch block 130 when positioned for engagement with the coupling feature 132.

The latch member 138 may be any apparatus or device operable to releasably engage the coupling feature 132. For example, the latch member 138 may be a shoulder bolt or a latch mechanism, among others. In one embodiment, the latch member 138 may releasably secure the coupling feature 132 within the blind hole or cavity 136 defined within the latch block 130. The latch member 138 may include opposing first and second ends 200, 202. The first end 200 may define a pivot axis P therethrough. In such embodiments, the latch member 138 may rotate about the pivot axis P to move between various positions, such as between a first (locked or engaged) position and a second (unlocked or disengaged) position. The second end 202 may define a lock tab 204 extending therefrom. As shown, the lock tab 204 may be shaped to facilitate engagement of the lock tab 204 with the coupling feature 132. For example, the lock tab 204 may include an inclined or beveled surface 206. In such embodiments, initial engagement of the coupling feature 132 with the inclined surface 206 may move the latch member 138 into engagement with the coupling feature 132, as detailed herein.

Depending on the particular application, the latch member 138 may be movably (e.g., pivotably) connected to the latch block 130 to move between first and second positions. In the first position, the latch member 138 may engage the coupling feature 132 on the cable 104. In the second position, the latch member 138 may disengage the coupling feature 132 on the cable 104. As one example, at least a portion of the latch member 138 (e.g., the lock tab 204) may selectively extend within the channel 134 (and/or within the blind hole or cavity 136) to engage the coupling feature 132 on the cable 104. In the first position, the lock tab 204 may extend within the channel 134 and/or blind hole or cavity 136 to engage the coupling feature 132 and secure the external device 102 to the cable 104. In the second position, the lock tab 204 may be removed from the channel 134 and/or the blind hole or cavity 136 to disengage the coupling feature 132 and release the external device 102 from the cable 104. In some embodiments, the latch member 138 may rotate within the slot 190 between the first and second positions. In such embodiments, the slot 190 may be in communication with the channel 134 and/or the blind hole or cavity 136 to permit the latch member 138 to selectively engage the coupling feature 132 and/or cable 104 received therein.

In some embodiments, engagement of the coupling feature 132 with the inclined surface 206 of the lock tab 204 may automatically move the latch member 138 from its first position to its second position, in response thereto. For example, as the coupling feature 132 is seated within the blind hole or cavity 136, an outer surface of the coupling feature 132 may engage the inclined surface 206 of the lock tab 204. In such embodiments, continued seating of the coupling feature 132 within the blind hole or cavity 136 may cause the latch member 138 to move out of its first position (such as towards its second position) as the inclined surface 206 rides along the outer surface of the coupling feature 132.

Once the coupling feature 132 clears the lock tab 204, the latch member 138 may be moved back to its first position, such as automatically. For example, the latch member 138 may be biased towards the first position (such as via a spring-like member) for automatic positioning of the latch member 138 into the first position. When the coupling feature 132 is fully seated within the blind hole or cavity 136 and the latch member 138 is positioned in its first position, the lock tab 204 may engage the coupling feature 132 to limit removal of the coupling feature 132 from the blind hole or cavity 136. For instance, in the first position of the latch member 138, the coupling feature 132 may be positioned between the lock tab 204 and the bottom of the blind hole or cavity 136 for engagement therein.

To remove the external device 102 from the cable 104, the coupling mechanism 150 may be disengaged from the coupling feature 132. For example, to disengage the coupling mechanism 150 from the coupling feature 132, the latch member 138 may be moved (e.g., rotated) to its second position. For instance, a user or automated actuator may lift up on or manipulate the second end 202 of the latch member 138 to rotate the latch member 138 about the pivot axis P and move the latch member 138 from its first position to its second position. Once the latch member 138 is positioned in its second position, the coupling feature 132 may clear the lock tab 204 and be removed from the blind hole or cavity 136.

Figure 14:
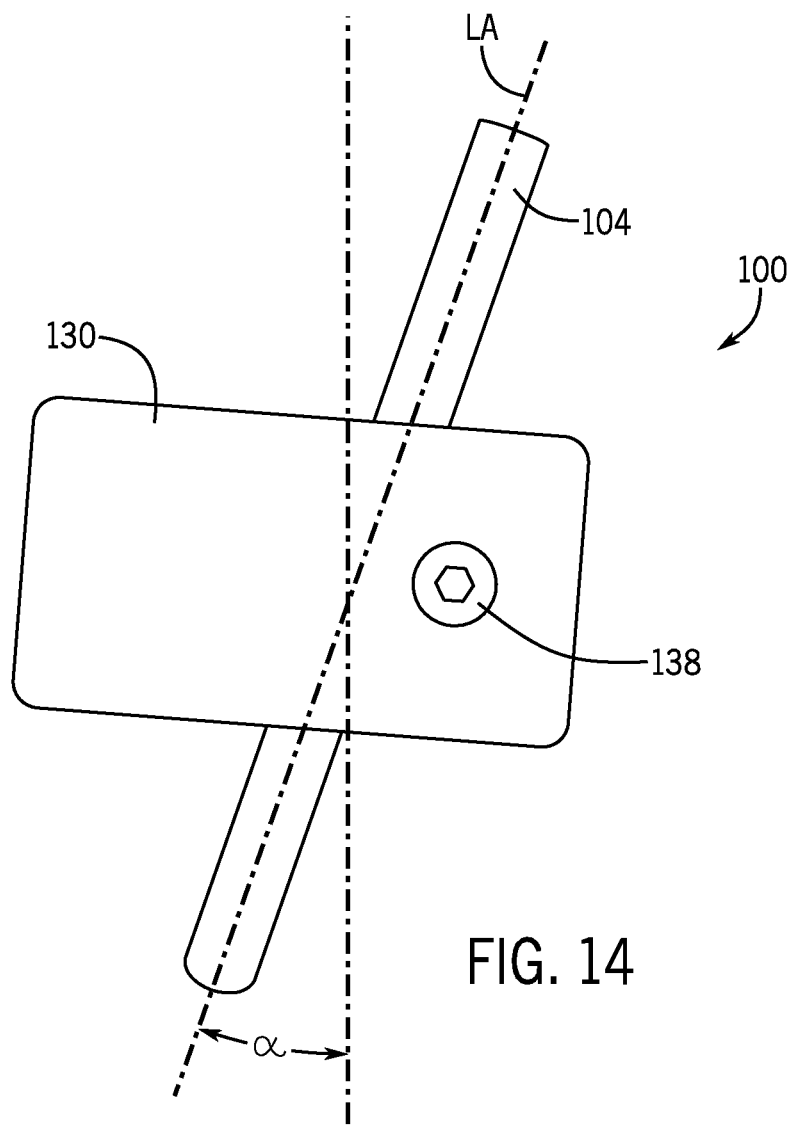
FIG. 14 is a top view showing a compliance angle of the attachment system.
Figure 15:
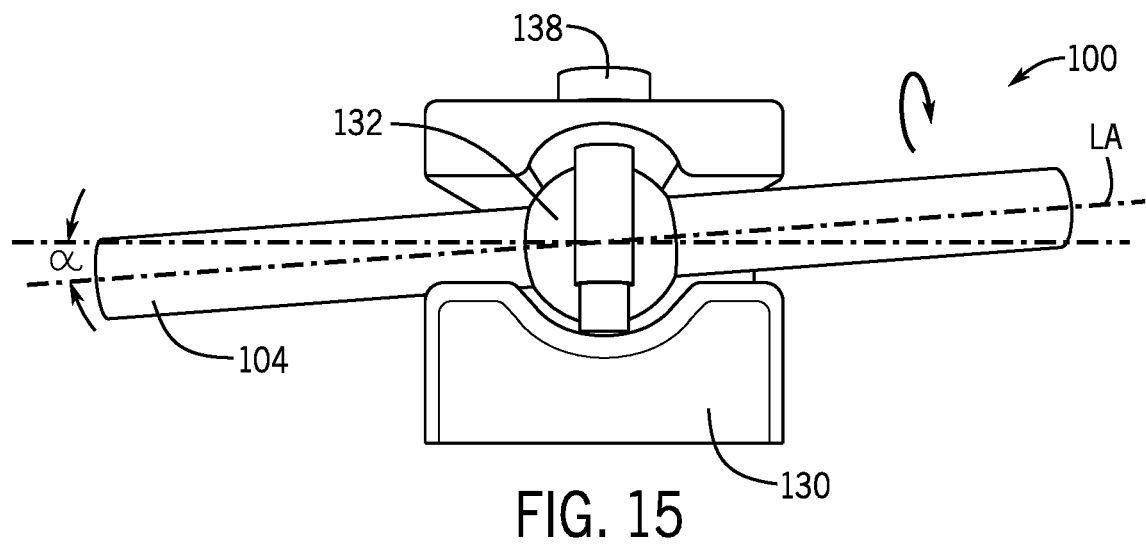
FIG. 15 is an elevation view showing additional compliance within the attachment between the latch block and the rope or cable.

FIG. 14 is a top view showing a compliance angle α of the attachment system 100. FIG. 15 is an elevation view showing additional compliance within the attachment between the latch block 130 and the cable 104.

According to the present disclosure, the coupling mechanism 150 may be rotatable and/or pivotable relative to the cable 104 with the latch block or latch apparatus 130 secured to the coupling feature 132. For example, as noted above, the engagement structure between the latch block 130, the latch member 138, and the coupling feature 132 may be adapted for the external device 102 to rotate and/or pivot relative to the longitudinal axis LA of the cable 104 with the latch block 130 secured to the coupling feature 132. When the coupling mechanism 150 is secured to the cable 104, the coupling feature 132 may be seated within the blind hole or cavity 136 and the cable 104 may extend within the channel 134 between the opposing side members 160 of the latch block 130. The relative dimensions of the various structures may be such as to permit movement of the coupling feature 132 within the blind hole or cavity 136 and/or movement of the cable 104 within the channel 134. For instance, the various components may be sized to permit the latch block 130 to rotate freely about the longitudinal axis LA of the cable 104.

Additionally or alternatively, the latch block or apparatus 130 may be pivotable about an axis orthogonal to the longitudinal axis LA of the cable 104, such as through a compliance angle α. Depending on the particular application, the compliance angle α may be between about 5 degrees and about 60 degrees, though other suitable angles are contemplated (such as between about 20 degrees and about 60 degrees, between about 5 degrees and about 30 degrees, or the like). In some embodiments, the compliance angle α may be different depending on the particular axis about which the latch block 130 rotates. For example, the compliance angle α may be greater with respect to the yaw rotation of the latch block 130 relative to the cable 104 (see FIG. 14), whereas the compliance angle α may be less with respect to the pitch rotation of the latch block 130 relative to the cable 104 (see FIG. 15).

In one exemplary example of the present disclosure, the attachment system 100 may be suited for use in a seismic node apparatus or system. The seismic node system may include a plurality of seismic nodes configured for selective attachment or coupling to the cable 104. For example, each seismic node may include the attachment system 100 operable to selectively secure the seismic node to the cable 104. As explained herein, the attachment system 100 may be configured to automatically couple the seismic node to the cable 104 during deployment. For example, during deployment of the seismic node system, the attachment system 100 of each seismic node may automatically engage the coupling feature 132 on the cable 104 as the cable 104 is fed alongside the seismic node during deployment, e.g., with the cable 104 in sliding engagement within the channel 134 as detailed herein.

The seismic nodes may include any suitable configuration. For example, and without limitation, each seismic node may include a housing suitable for deployment to a seismic medium and at least one seismic sensor disposed within the housing. In such embodiments, the attachment system 100 may be associated with the seismic node housing. For example, the latch block or latch apparatus 130 may be attached to, or otherwise defined as part of, the seismic node housing. For instance, at least a portion of the seismic node housing may be sized and shaped to define the latch block 130. Each seismic sensor may be configured to generate seismic signals responsive to seismic energy propagating in the seismic medium. In one embodiment, the attachment system 100 may be attached to an outer surface of the housing, such as to a top surface.

The seismic nodes may be substantially the same or identical to each other, or they may be different from one another within the seismic node system. As exemplary embodiments, the seismic nodes may be configured as disclosed in U.S. Provisional Patent Application No. 62/527, 646, MODULAR SEISMIC NODE, filed 30 Jun. 2017, which is incorporated by reference herein, in its entirety and for all purposes.

Figure 16:
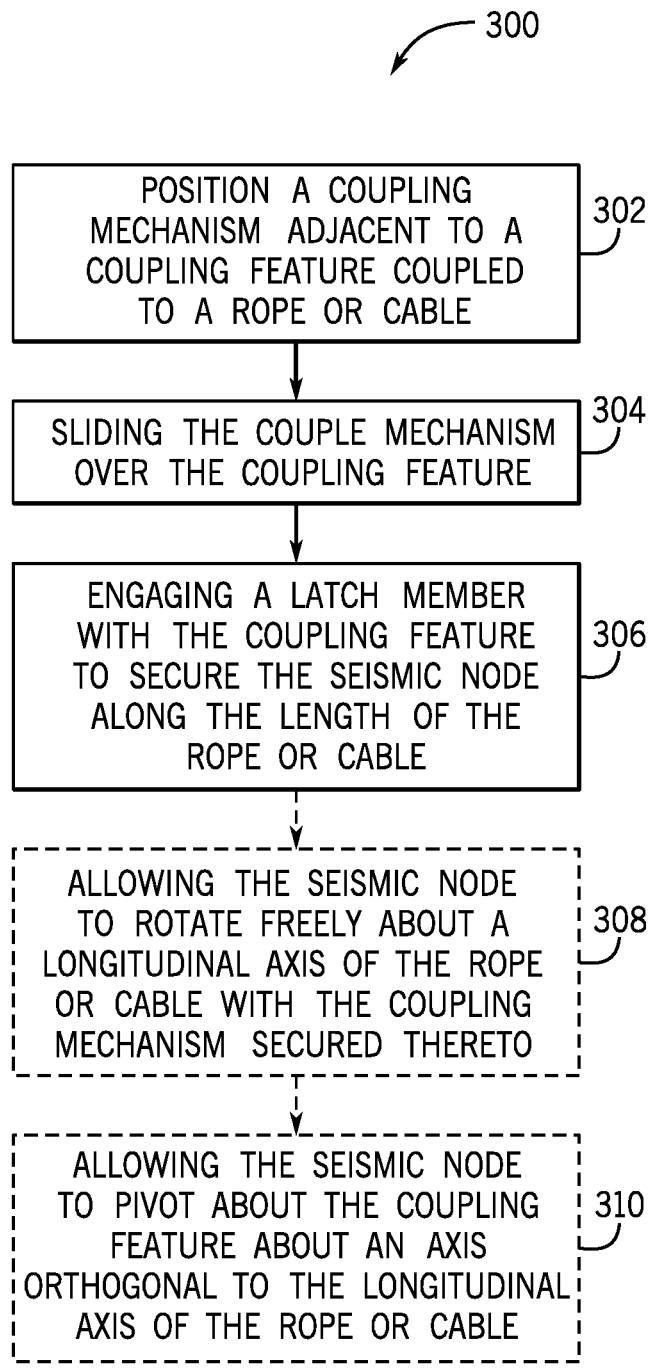
FIG. 16 is a flowchart illustrating a method of deploying a seismic node along a cable.

FIG. 16 is a flowchart illustrating a method 300 of deploying a seismic node for deployment along a cable 104. The method 300 may include positioning the coupling mechanism 150 adjacent the coupling feature 132 coupled to the cable 104 (Block 302), sliding the coupling mechanism 150 over the coupling feature 132 (Block 304), and engaging the latch member 138 with the coupling feature 132 to secure the seismic node along the length of the cable 104 (Block 306). As noted above, the coupling mechanism 150 may be attached to the seismic node or may be defined as part of the seismic node itself. The coupling feature 132 may be affixed to the cable 104 at defined positions or may be repositionable along the cable 104 during the deployment and/or retrieval operation. For example, during deployment of the cable 104 to a water column or other seismic medium, a user may position the coupling feature 132 along the length of the cable 104 as desired, such as to define a desired spacing between seismic nodes.

Depending on the particular application, positioning the coupling mechanism 150 adjacent the coupling feature 132 may include feeding the cable 104 through the channel 134 defined through the latch block or apparatus 130 until the coupling feature 132 is positioned adjacent the latch block 130. In some embodiments, positioning the coupling mechanism 150 adjacent the coupling feature 132 may include positioning the coupling feature 132 adjacent or within the blind hole or cavity 136 defined within the channel 134 of the latch block 130.

In some embodiments, sliding the coupling mechanism 150 over the coupling feature 132 may include seating the coupling feature 132 within the blind hole or cavity 136 defined within the latch block 130. The coupling feature 132 may be seated within the blind hole or cavity 136 upon continuous feeding of the cable 104 through the channel 134. For example, as the cable 104 is fed through the channel 134, the coupling feature 132 may engage and subsequently seat within the blind hole or cavity 136 of the latch block 130. More specifically, the latch block 130 may be oriented relative to the cable 104 such that feeding the cable 104 through the channel 134 causes the coupling feature 132 to seat within the blind hole or cavity 136.

In such embodiments, seating the coupling feature 132 within the blind hole or cavity 136 may automatically engage the coupling feature 132 with the latch member 138. For instance, as the coupling feature 132 seats within the blind hole or cavity 136, the coupling feature 132 may engage the inclined surface 206 of the lock tab 204 to move the latch member 138 for sliding movement of the coupling feature 132 thereby. Once the coupling feature 132 is seated sufficiently within the blind hole or cavity 136 to clear the lock tab 204, the latch member 138 may rotate to its first position to secure the coupling feature 132 to the latch block 130. In some embodiments, seating the coupling feature 132 within the blind hole or cavity 136 may rotate the seismic node substantially orthogonal to the cable 104.

With continued reference to FIG. 16, the method 300 may include the seismic node rotating freely about the longitudinal axis LA of the cable 104 with the coupling mechanism 150 secured thereto (Block 308). In some embodiments, the method 300 may include the seismic node pivoting about the coupling feature 132 about an axis orthogonal to the longitudinal axis LA of the cable 104 (Block 310). Such configurations may provide for the seismic node to move relative to the cable 104, e.g., by rotating about the longitudinal axis of the cable 104 or pivoting about an axis perpendicular to the cable 104, as the seismic node system is deployed to a seismic medium.

While the present disclosure has been described with respect to exemplary embodiments and examples, it is understood that changes may be made and equivalents can be substituted to adapt the disclosure to different materials, applications, and technical problems, while remaining within the spirit and scope of the invention as claimed. The invention is thus not limited to the particular examples and embodiments that are described, but encompasses all embodiments falling within the scope of the appended claims.

What is claimed is:

1. An attachment system for securing an object to a rope or cable, the attachment system comprising:
 a latch apparatus including opposing side members defining a channel extending through the latch apparatus, the channel sized for selective receipt of the rope or cable therein;
 a latch member movably connected to the latch apparatus for selective engagement with a coupling feature on the rope or cable as the rope or cable is received within the channel; and
 a blind hole or cavity defined within and along a depth of the channel, the blind hole or cavity having a diameter greater than a width of the channel, wherein the coupling feature is receivable within the blind hole or cavity.

2. The attachment system of claim 1, wherein the latch member comprises a lever mechanism configured to releasably engage the coupling feature to secure the object to the rope or cable with the coupling feature disposed in the blind hole or cavity.

3. The attachment system of claim 1, wherein the coupling feature comprises a stop member selectively engaged with the rope or cable, and:
   wherein the stop member has a diameter greater than the width of the channel; or
   wherein the stop member is movable along the rope or cable to a selected position.

4. The attachment system of claim 1, wherein the opposing side members of the latch apparatus comprise first and second side plates extending from a main body, and:
   wherein the channel is defined between the first and second side plates; or
   wherein the main body and the first side plate of the latch apparatus abut an outer surface of the object for attachment of the object to the rope or cable.

5. The attachment system of claim 1, wherein the latch apparatus is pivotable about an axis orthogonal to a longitudinal axis of the rope or cable with the latch apparatus secured thereto; and
   wherein the latch apparatus is further pivotable about the axis through a compliance angle greater than 5 degrees; or
   wherein the compliance angle is between about 20 degrees and about 60 degrees.

6. The attachment system of claim 1, wherein the latch apparatus is rotatable about a longitudinal axis of the rope or cable with the latch member rotationally engaged with the coupling feature.

7. The attachment system of claim 1, wherein:
   at least a portion of the latch member selectively extends within the channel to engage the coupling feature on the rope or cable within the blind hole or cavity; or
   the latch member is pivotably connected to the latch apparatus to move between a first position engaged with the coupling feature on the rope or cable within the blind hole or cavity, and a second position disengaged from the coupling feature on the rope or cable.

8. The attachment system of claim 7, wherein:
   the latch member includes a lock tab extending from a main body of the latch member, and:
      in the first position, the lock tab extends within the channel to engage the coupling feature within the blind hole or cavity and secure the object to the rope or cable; and
      in the second position, the lock tab disengages the coupling feature and releases the object from the rope or cable; or
   the latch member is biased towards the first position for automatic engagement with the coupling feature when the rope or cable is received within the channel.

9. The attachment system of claim 1, further comprising a seismic device secured to the rope or cable by the attachment system for deployment to a water column, the seismic device selected from a seismic node, an acoustic pinging device, a streamer recovery device, a depth control device, and a lateral control device.

10. An attachment system for securing an object to a rope or cable, the attachment system comprising:
   a latch apparatus including opposing side members defining a channel extending through the latch apparatus, the channel sized for selective receipt of the rope or cable therein; and
   a latch member movably connected to the latch apparatus for selective engagement with a coupling feature on the rope or cable as the rope or cable is received within the channel,
   wherein the coupling feature comprises a swage button or ferrule member coupled to the rope or cable by compressive engagement therewith;
   wherein at least one of (i) the latch apparatus is attached to the object for deployment in a selected position along the rope or cable, the selected position defined by positioning the coupling feature in frictional sliding engagement along the rope or cable; or (ii) the latch apparatus is formed integrally with at least a portion of the object for deployment along the rope or cable.

11. A method of deploying an object along a rope or cable, the method comprising:
   positioning a coupling mechanism adjacent a stop member selectively affixed to the rope or cable, the coupling mechanism comprising a latch member configured for selective engagement within a channel extending through the coupling mechanism, wherein the stop member is disposed within a blind hole or cavity defined within the channel;
   engaging the coupling mechanism with the stop member, wherein the rope or cable is slidingly disposed within the channel; and
   engaging the latch member with the stop member to secure the object along the rope or cable thereby seating the stop member within the blind hole or cavity.

12. The method of claim 11, further comprising:
   rotating the object about a longitudinal axis of the rope or cable with the latch member rotationally coupled to the stop member; or
   pivoting the object about an axis orthogonal to the rope or cable with the latch member pivotably coupled to the stop member.

13. The method of claim 11, further comprising feeding the rope or cable through the channel extending through the coupling mechanism such that the stop member is positioned within the coupling mechanism.

14. The method of claim 11, wherein the object comprises a seismic node, and further comprising:
   feeding the rope or cable through the channel in sliding engagement therewith, wherein the latch member is actuated in response to the stop member engaging and seating within the blind hole or cavity; or
   rotating a housing of the seismic node to a substantially orthogonal orientation with respect to the rope or cable in response to seating the stop member within the blind hole or cavity.

15. The method of claim 11, wherein:
   seating the stop member within the blind hole or cavity automatically engages the stop member with the latch member; or
   the latch member comprises a shoulder bolt or a pivoting latch mechanism configured to engage the stop member seated within the blind hole or cavity.

\* \* \* \* \*